US007502761B2

(12) United States Patent
Siegal et al.

(10) Patent No.: US 7,502,761 B2
(45) Date of Patent: Mar. 10, 2009

(54) METHOD AND SYSTEM FOR PROVIDING ONLINE AUTHENTICATION UTILIZING BIOMETRIC DATA (75) Inventors: Jon Siegal, Los Angeles, CA (US); Simon Rowell, San Jose, CA (US); Thomas Hintz, San Francisco, CA (US)

(73) Assignee: YT Acquisition Corporation, Delray Beach, FL (US)

( * ) Notice: Subject to any disclaimer, the term of this patent is extended or adjusted under 35 U.S.C. 154(b) by 147 days.

(21) Appl. No.: 11/669,530

(22) Filed: Jan. 31, 2007

(65) Prior Publication Data
US 2007/0198435 A1 Aug. 23, 2007

Related U.S. Application Data (60) Provisional application No. 60/828,711, filed on Oct. 9, 2006, provisional application No. 60/765,621, filed on Feb. 6, 2006, provisional application No. 60/765,579, filed on Feb. 6, 2006.

(51) Int. Cl.
H04K 1/00 (2006.01)
H04L 9/00 (2006.01)
(52) U.S. Cl. .............................. 705/67; 705/64; 713/186
(58) Field of Classification Search .................. 705/65, 705/67
See application file for complete search history.

(56) References Cited

U.S. PATENT DOCUMENTS

| 5,764,789 | A | * | 6/1998 | Pare et al. ................... 382/115 |
| 5,930,804 | A |   | 7/1999 | Yu et al. |
| 6,559,769 | B2 | * | 5/2003 | Anthony et al. ............. 340/574 |
| 6,879,965 | B2 |   | 4/2005 | Fung et al. |
| 7,219,154 | B2 | * | 5/2007 | Blakley et al. .............. 709/229 |
| 2007/0150419 | A1 |   | 6/2007 | Kozlay |
| 2007/0180263 | A1 |   | 8/2007 | Delgrosso et al. |

FOREIGN PATENT DOCUMENTS

EP 1 732 008 A1 12/2006

OTHER PUBLICATIONS

Geyer, Security Assertion Markup Language (SAML) Version 1.1 Ratified as OASIS Standard. OASIS News (online), Sep. 22, 2003 (retrieved on Aug. 21, 2007), www.oasis-open.org/news/oasis_news_09_22_03.php, especially p. 1.

* cited by examiner

Primary Examiner—Calvin L Hewitt, II
Assistant Examiner—Zeshan Qayyum
(74) Attorney, Agent, or Firm—Pepper Hamilton LLP (57) ABSTRACT A system and method for securely authenticating a user for the purpose of accessing information, such as private financial or personal information, in an online environment are disclosed. In addition, a system and method for allowing consumers to make secure payments from an electronic wallet with biometric authentication are disclosed.

22 Claims, 4 Drawing Sheets

Biometric Online Authentication Provider System

FIGURE 1
Biometric Online Authentication Provider System

Fig 2 – User Registration with Authentication Provider Service

Fig 3 – Online Authentication of Registered User

Fig 4 – Payment Processing with Online Authentication

METHOD AND SYSTEM FOR PROVIDING ONLINE AUTHENTICATION UTILIZING BIOMETRIC DATA

CLAIM OF PRIORITY

This application claims priority benefit under 35 U.S.C. § 119(e) from provisional application numbers 60/765,621, filed Feb. 6, 2006, 60/765,579, filed Feb. 6, 2006 and 60/828,711, filed Oct. 9, 2006. All the foregoing provisional applications are incorporated by reference herein, in their entirety, for all purposes.

TECHNICAL FIELD

This invention pertains to online authentication and transactions and more specifically, a method and system for providing secure authentication of customers seeking to access secure information and financial services via an online interface.

BACKGROUND

More frequently, customers are turning to the convenience of websites for accessing and managing financial account information and to engage in e-commerce and other online transactions. Consequently, Internet users face a growing threat from online fraud. Identity thieves take advantage of the anonymity of the Internet, its relative insecurity as compared to bricks and mortar outlets, and its ability to provide programmatic access to any information. Nevertheless, consumers remain enamored by the case of use of Internet banking and e-commerce sites (Morgan Stanley estimates 61% of US population is online—181 million users) but do not do enough to protect themselves. For example, according to information obtained by RSA Security and Network Intelligence, 81% of people surveyed thought identity theft was a critical issue, but less that 46% were motivated to change passwords regularly and only 4% made the effort to check credit reports. As noted by the Federal Financial Institutions Examination Council ("FFIEC"), "an effective authentication system is necessary for compliance with requirements to safeguard customer information, to prevent money laundering and terrorist financing, to reduce fraud, to inhibit identity theft, and to promote the legal enforceability of . . . electronic agreements and transactions." Consequently, online service providers, such as financial institutions ("FI") and e-commerce merchants, have a need for secure and reliable online authentication solutions utilizing multiple factors ("multifactor") of authentication.

Current methods of allowing customer access to financial information and electronic funds transfers online provide unsatisfactory levels of security. For example, a typical implementation of online authentication might involve a user, such as an account holder at an FI, selecting or being assigned a username and pass code (single-factor authentication) for access to secure information, such as account records. However, usernames and pass codes may be easily compromised through well-known Internet fraud techniques. According to the FFIEC's recently issued guidelines, stronger, multi-factor forms of authentication are needed. FFIEC agencies "consider single-factor authentication, as the only control mechanism, to be inadequate for high-risk transactions involving access to customer information or the movement of funds to other parties. Financial institutions offering Internet-based products and services to their customers should use effective methods to authenticate the identity of customers using those products and services" (see Federal Financial Institutions Example Council, "Authentication in an Internet Banking Environment", 2005). The FFIEC further makes the following observations:

1. Multi-factor authentication provides much better security than single-factor authentication (username and passcode).
2. Financial institutions should conduct a risk assessment to see whether their existing authentication system is deemed adequate.
3. A successful authentication system "should have customer acceptance, reliable performance, scalability to accommodate growth, and interoperability with existing systems and future plans".
4. If critical systems are outsourced to third-parties, appropriate monitoring and reporting processes should be in place. Suspicious activities need to be reported by the third-part organization rapidly. The ability for external audits would need to be supported.

Similar issues affect the operation and security of e-commerce websites. Most merchant websites currently implement their own identity management systems. While these systems provide a merchant the capability to manage its customer base and provide some level of personalization, the focus of online merchants is rapidly shifting to providing a security barrier against fraudulent access. With merchant websites requiring constant content and structure updates (what is developed today will soon be obsolete), no website is ever "complete" and is continually open to new security exploitations.

To address these needs, the present disclosure describes a third party-maintained authentication infrastructure whereby online service providers, such as financial institutions and e-commerce merchants utilize a registered biometric device as part of the login process for a registered and trusted user.

SUMMARY

The present disclosure relates to a method for securely authenticating a user for the purpose of accessing online financial information and other online personal information. The method enables a user to utilize a biometric sensor device connected to a personal computer or laptop, such that the user can log in securely to websites either without the use of a username and password, or as added security in addition to a username and password. The user would then be allowed access to the site if he is positively authenticated. Specifically, one of the authentication methods taught herein comprise receiving biometric device identification information associated with a biometric device coupled to an online terminal (used by the user), receiving a biometric sample of the user taken by the biometric device, retrieving at least one registered biometric sample associated with the biometric device identification information, comparing the biometric sample with at least one registered biometric sample, upon a match with at least one registered biometric sample, retrieving a user identifier associated with the matched registered biometric sample, extracting a federated identity (as further detailed below) associated with the user identifier and the online service provider, and transmitting the federated identity to the online service provider. Due to the use of biometrics and the device identification information, multifactor authentication of the user is achieved through the authentication methods described herein.

In addition, the present disclosure teaches methods of payments for e-commerce merchant websites. Such payment methods may be used in concert with the authentication methods above to allow consumers to make secure payments through the use of an electronic wallet, using electronic checking or credit/debit cards with biometric authentication. Specifically, one of the payment methods taught herein comprises receiving from the e-commerce merchant payment transaction details relating to an e-commerce purchase being conducted by the user at the e-commerce merchant website; extracting electronic wallet information relating to a user identifier that was obtained during an authentication process as taught herein, transmitting at least a portion of the electronic wallet information and at least a portion of the payment transaction details to a payment processor; and transmitting an approval message to the e-commerce merchant indicating whether the payment processor has authorized the e-commerce purchase. Because such payment methods do not require that the merchant receive electronic wallet information relating to the user (such as financial account information), the security and privacy of user information are increased.

As further detailed below, the present disclosure also teaches an authenticator provider system that may enable the authentication and payment methods described above. Such a system may comprise an identity management software component configured to receive biometric samples from user terminals and to transmit federated identifies to the online service providers, a biometric authentication server software component configured to receive biometric samples from the identity management software component and to compare the received biometric samples to registered biometric samples, a biometric directory configured to store the registered biometric samples in association with user identifiers and biometric device identification information; and a federated identity directory configured to store the federated identifies in association with the user identifiers and the online service providers.

The methods and systems taught herein contribute to the effort of reducing illegitimate access to online service provider web environments. By using the authentication provider service, online service providers can outsource positive authentication to a hosted and trusted system that provides non-repudiation and a verified federated identity. In addition, the authentication provider service may also provide access to user electronic wallets to e-commerce merchants, obviating the need for e-commerce merchants to manage the storage of users' personal financial information and providing a central location for users to store such sensitive information.

DETAILED DESCRIPTION

Figure 1:
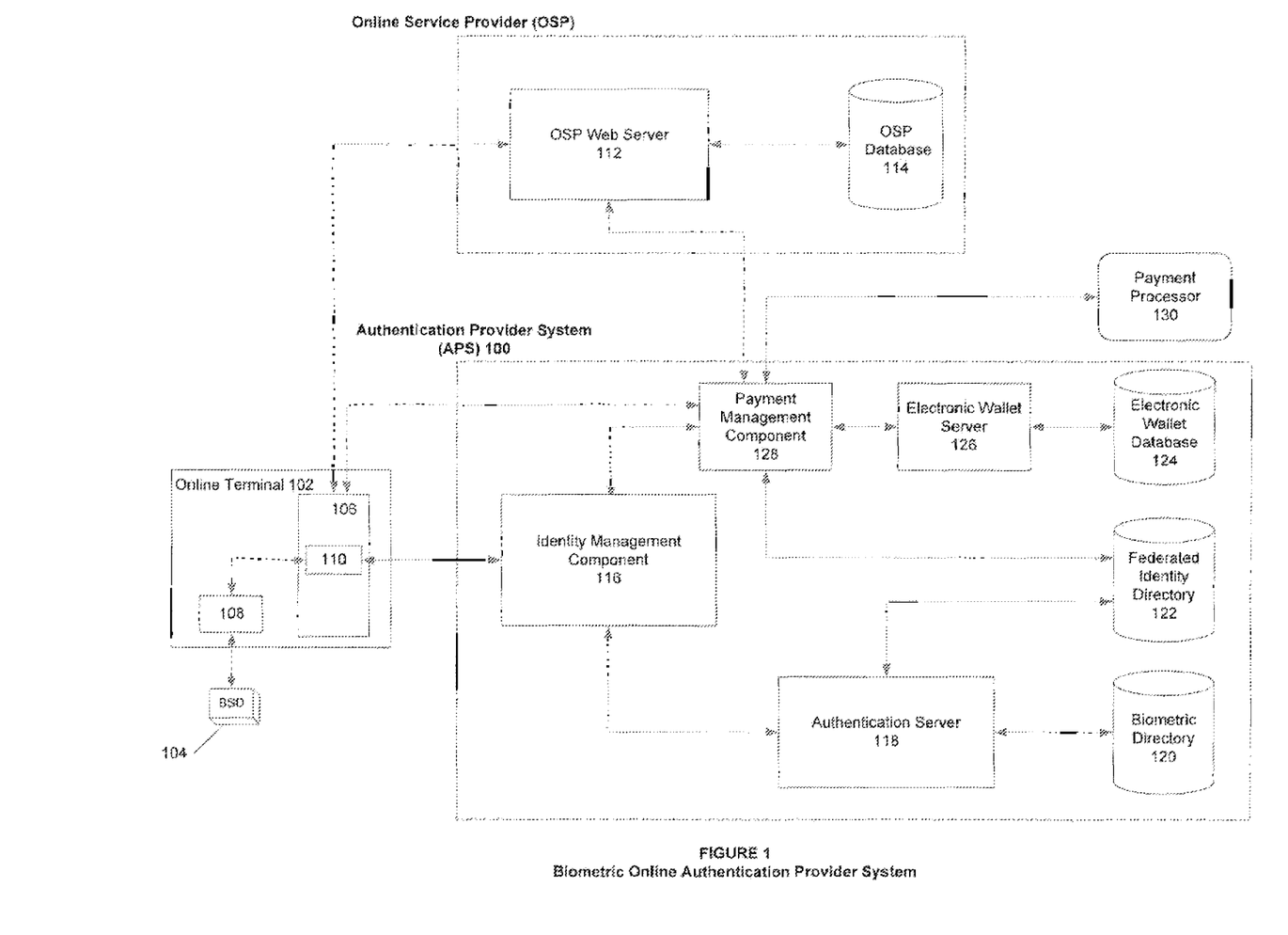
FIG. 1 depicts an exemplary biometrically enhanced authentication service provider infrastructure architecture for online authentication and e-commerce transactions according to an embodiment.

FIG. 1 depicts one embodiment of a biometrically enhanced infrastructure architecture for authenticating a user for the purpose of accessing secure information or conducting financial transactions online. An online authentication provider service ("APS") 100 provides biometric authentication and electronic wallet services within an overall online environment, which includes various other components that enable the APS 100 to authenticate a user biometrically in order to verify his identify, for example, to securely log in to online service provider websites, or to conduct financial transactions with an e-commerce merchant.

As depicted in FIG. 1, the APS 100 contains and interacts with a variety of components. An online terminal such as a user' personal computer ("PC") 102 is connected to biometric sensor device ("BSD") 104, such as a fingerprint sensor, via, for example, a USB cable. BSD 104 may have unique device identification information and has the capability of obtaining a sample biometric template (and/or new biometric image data) based on a finger scan of the user, which may then be ultimately transmitted (in either template or raw image form) to the APS 100. Although BSD 104 is illustrated as separate from online terminal 102, BSD 104 may alternatively be integrated into online terminal 102 or a PC peripheral (e.g., keyboard, mouse, etc.), for example, as an integrated fingerprint swipe sensor in a laptop. Online terminal; 102 contains software necessary for an online authentication process such as the one described herein. Such software may include a web browser 106, device drivers 108 to communicate with BSD 104, and a downloaded web browser component 110 (e.g. ActiveX controls, Java applets, and/or other "plug-in" components etc.) for managing BSD 104 and enabling communication between BSD 104 and APS 100. Online terminal 102 is connected via a network, such as the Internet, to online service provider ("OSP") web server 112, wherein the OSP, for example are e-commerce vendor or FI with online login technology, is an entity subscribing to the authentication service offered by the APS 100 and with whom the user may have a registered account. The web browser component 110 in the web browser 106 may be utilized to obtain network identifying information (e.g., OSP IP address) from OSP web server 112 and a session ID related to the user' communication session with the OSP website for which authentication is being provided. OSP web server 112 is coupled to at least one OSP database 114, which stores OSP registration information about users authorized to access information and services or conduct transactions at the OSP website 112, including user identity information that may be matched with a federated user identity contained in a security assertion markup language ("SAML") token that may be generated by the APS 100 and transmitted to the OSP web server 112 (or otherwise shared between the APS 100 and OSP web server 112) to indicate that the user has authenticated himself to the APS 100 without requiring the APS 100 and OSP web server 112 to share personal information relating to the user.

Within the APS 100, an identity management component 116 may provide web content (e.g., web code relating to identity management functions, such as HTML, JavaScript, etc.) to web browser 106 when the user visits a web page delivered by the OSP web server 112 during an authentication transaction. Once instructed by the OSP web server 112, the web content provided by the identity management component 116 to the browser 106 may cause the web browser component 110 to initiate and manage direct communication between the online terminal 102 and the identity management component 116. During such communication, the identity management component 116 may initiate the management of functionality at the APS 100, 100 relating to user account management, device management, federated identity management and session management. Additionally, during a process of enrolling a suer with the APS 100, the identity management component 116 may also provide software downloads to online terminal 102, such as the downloaded web browser component 110 and device drivers 108 to enable the online terminal 102 to communicate with the BSD 104. Identity management component 116 is also coupled to a biometric authentication server 118 to which it may transmit biometric information (e.g., fingerprint template or image data) of the user and the BSD 104 device identification information that is acquired from online terminal 102. The biometric authentication server 118 is coupled to a biometric directory 120 and utilizes the BSD 104 device identification information to locate registered user biometric templates stored in association with such device identification information in order to conduct a comparison of the sample biometric template to stored biometric templates to verify the user. If the comparison results in a verification, the biometric directory 120 may provide user identification information (e.g., an internal user identifier) to the biometric authentication server 118 which may utilize such user identification information to obtain from the federated identity directory 122 a federated identity (e.g., contained in a SAML token) associated with the user and the particular OSP (e.g., as identified by an OSP ID and certificate or other OSP identifying information received by the APS 100 through web browser component 110) pertaining to the transaction at hand. Such a federated identity and a session ID (e.g., related to the user's particular transaction and obtained by the APS 100 via communication with the web browser component 110 as described above) may then be transmitted by identity management component 116 to OSP web server 112 via browser component 110. In an alternate embodiment, the identity management component 116 may transmit such a federated identity and a session ID directly to OSP web server 112, rather than via web browser component 110. The federated identity is recognized by OSP web server 112 as related to the user engaged in an authentication transaction related to the session ID and the OSP web server 112 is able to authenticate the user for secure access to the OSP website.

In one embodiment, in addition to authentication transactions, APS 100 may be further enable to conduct payment transactions between an authenticated user and an OSP 112 that is an e-commerce merchant. In such an embodiment, APS 100 may additionally have a payment management component 128 that interacts with the OSP web server 112, the web browser 106 at the online terminal 102, the identity management component 116, an electronic wallet server 126, and payment processor 130. During a payment transaction, OSP web server 112 communicates with payment management component 128 in order to submit purchase-related information to payment management component 128. Once the payment management component 128 obtains such payment information, it is able to correspond directly with the user through the web browser 106 (e.g., by redirection through the OSP web server 112) to obtain any approvals directly from the user and coordinate any identity verification and payment processing activities that need to be conducted internally with the APS 100. For example, if a user engaged in an e-commerce transaction has not been authenticated by the APS 100 (e.g., as part of a log-in process for a personalized experience at the OSP website), the payment management component 128 may interact with the identity management component 116 to authenticate the user. Once the user is authenticated, the user identification information obtained from the biometric directory 120 (as previously discussed) may be used by the payment management component 128 to obtain an electronic wallet related to the user (stored in an electronic wallet database 124) from an electronic wallet server 126. The payment management component 128 may then utilize financial account information (e.g. credit card, debit card, eCheck, stored value accounts or other payment modalities) stored in the electronic wallet to interact with a payment processor 130 to process and authorize the payment transaction. As described earlier, in addition to financial account information, other personal data stored in an electronic wallet (i.e., that is obtained during a user enrollment or registration with the APS 100) could include, without limitation, merchant specific loyalty information (e.g., loyalty identification numbers, etc.), healthcare information (e.g. policy number, insurance carrier, etc.) and other personal information (e.g., a unique identification number, name, address, date of birth, driver's license information, email address, home phone number, mobile phone number, etc.). Once payment has been authorized by the payment processor 130, the payment management component 128 may communicate with the OSP web server 112 to confirm a successful purchase. In an alternative payment embodiment (not depicted in FIG. 1), the payment processor 130 may be coupled directly to the OSP rather than to APS 100. In such an embodiment, the payment management component 128 may submit a user' payment information to the OSP web server 112 which communicates with the payment processor itself 130 to authorize the transaction. Alternatively, those with ordinary skill in the art will recognize that such payment information may be transmitted by the payment management component 128 directly to the web browser 106 at the online terminal 102 to be populated into the OSP's web page.

Those of ordinary skill in the art will recognize that the various communication channels and components depicted in FIG. 1 may be implemented in a variety of known techniques and manners. For example and without limitation, a dedicated TCP/IP connection between the payment processor 130 and the ASP 100 may be used, or Internet connections may be considered in alternative embodiments. Similarly, rather than having the online terminal 102 communicate with APS 100 through a wired network, alternative embodiments may utilize a wireless network system for communication between the online terminal 102 and the APS 100. The online terminal 102 may also be any suitable device capable of navigating to an OPS hosted web page, such as a web-enable mobile phone, PDA, and the like. As those of ordinary skill in the art will recognize, the communication among the various components of APS 100, OSP web server 112 and online terminal 102 may be implemented through a variety of private or proprietary networked connections or through the Internet or other publicly accessible networks. Those of ordinary skill in the art will recognize that the control logic and data stored and used by the various computer components as described above is merely illustrative and may be distributed throughout the various computer components' logic controls and databases in alternative but functionally equivalent designs, including without limitation, the removal of certain components and addition of other components, without departing from the scope or spirit of the described embodiments. For example, in an alternative embodiment of the components of the online terminal 102 and BSD 104, certain functionality performed by the web component 110 may be dispersed between BSD 104 and identity management component 116, thereby eliminating the need to download and install web browser component 110 in order to communicate directly with the APS 100. Rather, specialized code embedded in BSD 104 would work in concert with web browser 106 to communicate with identity management component 116. For example and without limitation, the BSD 104 may contain a web server component and various security and encryption components such that the BSD 104 in essence serves as another network device (with a network address) that interacts with the web browser 106 as a specialized web server providing secure biometric services and functions.

User Registration with Authentication Provider Service

Figure 2:
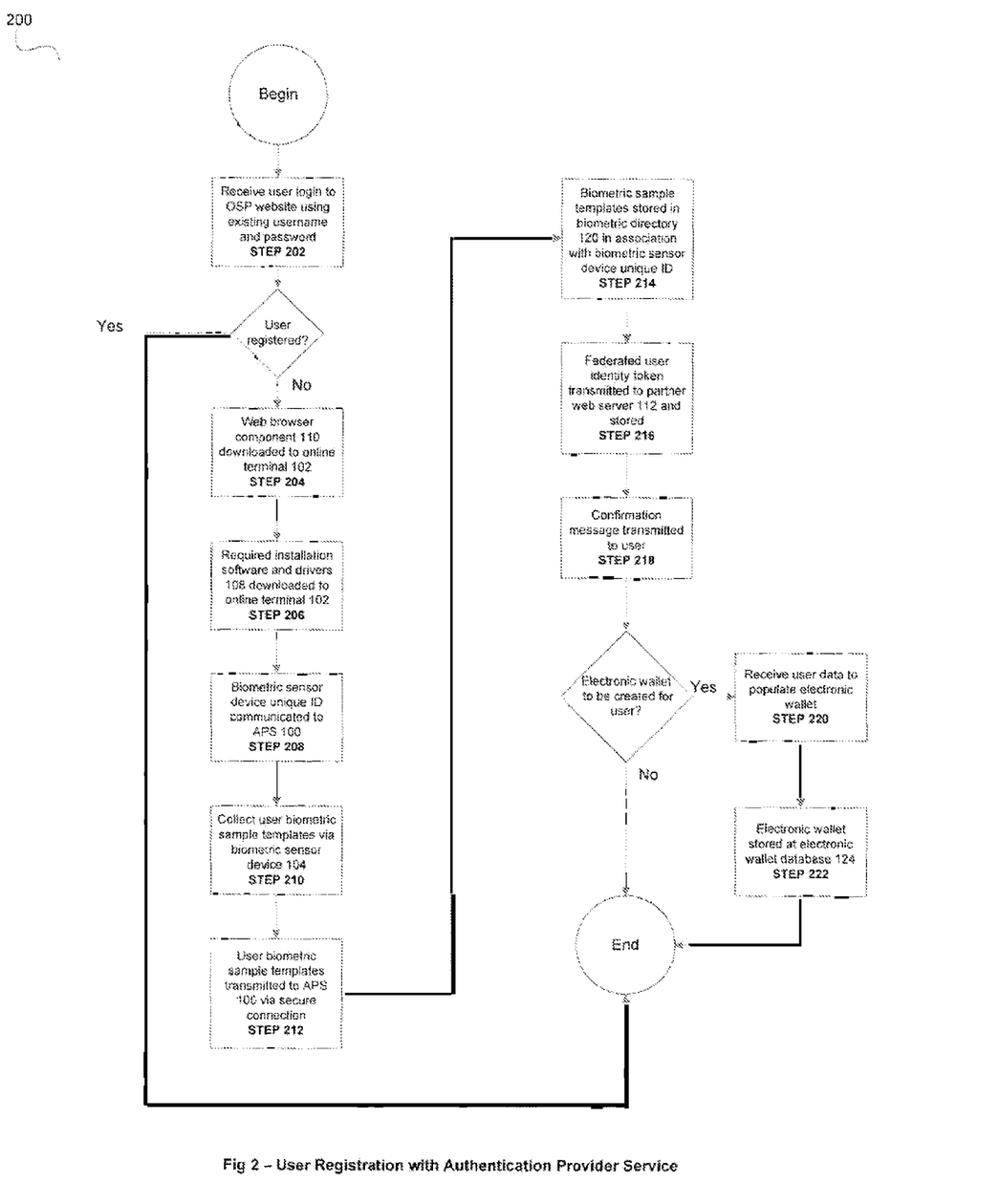
FIG. 2 depicts a flow chart for an exemplary process of enrolling a user to use an authentication provider service at an online service provider website according to an embodiment.

To utilize the APS 100 in order to gain biometrically authenticated access to an OSP, a user enrolls or registers his BSD 104 and biometric data with the authentication provider service as depicted in FIG. 2. Although FIG. 2 will be described in terms of a new APS enrollment conducted at a website of an affiliated OSP, a user could have previously enrolled information directly through an enrollment website offered by the APS 100 itself or through a previously affiliated OSP. A user having a web login account with an OSP utilizing APS 100 is offered an opportunity to enroll with the APS 100 to utilize biometric online access. The user may be offered enrollment via an email or other message from the OSP or may be offered enrollment directly when he navigates to the OSP website and logs in using his existing username and password. As previously discussed, in certain embodiments, the user's web enrollment interaction may be implemented through a redirection (via web code embedded in the web page of the OSP) from the OSP website to a website hosted by identity management component 116 of the APS 100. If the user desires to enroll in the APS 100, the user obtains or is provided with a BSD 104 (e.g., the OSP may send the BSDE 104 to the user or the user may purchase one a retail location), if necessary (i.e. a user may already possess an appropriate BSD 104, such as one integrated into his online terminal 102). As illustrated in FIG. 2, to begin the process of registering for a biometrically authenticated login at an affiliated OSP website, the user navigates to the OSP website and logs in using his existing username and password (step 202). If the user already possesses an appropriate BSD 104, the user then downloads (via redirection to the identity management component 116 of the APS 100 as described above) and installs a web browser component 110 (e.g. ActiveX control or other browser plug-in browser helper object) (step 204), which manages communication between the user's web browser 106 and the APS 100 during an online authentication transaction. If needed, the user may also download additional client software, such as device drivers 108, for BSD 104 (step 206). Those with ordinary skill in the art will recognize that alternative embodiments may utilize the OSP web server 112 itself, rather than a redirection to web pages/frames hosted by the identity management component 116 at the APS 100 to guide the user through an enrollment process. Once the local client software (e.g., device drivers 108, web browser component 110, etc.) is downloaded and installed, the APS 100 may communicate with BSD 104 (via the web browser component 110 and device drivers 108) in order to activate and register the device with APS 100 which may be stored in biometric directory 120 and used during subsequent communication, the BSD 104 may transmit device identification information (e.g. unique device ID) to the APS 100 which may be stored in biometric directory 120 and used during subsequent transactions to access user biometric information stored in association with the device identification information (step 208).

After the device identification information has been collected and stored, the website or web component 110 may then prompt the user to provide biometric samples (step 210) via the BSD 104. Multiple biometric scans may be taken to ensure accurate matching. For example, three scans might be taken from an index finger of each hand, for a total of six scans for an enrolling user. Depending upon the embodiment, the biometric samples are either converted to templates within the online terminal 102 or BSD 104 and transmitted to the APS 100, or raw image data may be transmitted to the APS 100 which then converts the raw image data to a biometric template (step 212). The user's biometric templates are submitted by the identity management component 116 to authentication server 118 and stored in biometric directory 120 as the user' registered biometric samples in association with the previously received biometric device identification information and the internal user identifier (such an identifier is generated if it was not already generated during the creation of an existing user electronic wallet, e.g., through a previous enrollment) (step 214). The authentication server 118 may then generate a unique federated identity (e.g., that may subsequently be used as in a SAML authentication token or document) relating specifically and used solely between the particular OSP and the APS 100, which is transmitted to the OSP website server 112 for storage in OSP database 114 (step 216). The generated federated identity may be stored in the APS 100 in the federated identity directory 122 in association with the user'internal identifier used by the APS 100 among its various databases. The user may then be informed that the OSP website is now biometrically secure and invited to test the biometric authentication (step 218).

In embodiments that implement an APS 100 with online payment services, the user may additionally submit various personal data to create an electronic wallet (step 220). As previously discussed, such personal data may include name, mailing address, home phone number, email address, demographic data (e.g., age, date of birth, gender, etc.) and the like. Additionally, the individual can register a password, a PIN, and/or knowledge-based information (e.g., "out of wallet" data that an unauthorized individual is unlikely to know, such as his mother's maiden name, the name of his favorite sports team, or the name of a childhood friend, etc.). In one embodiment, existing user account information stored at the OSP database 114 could be utilized to populate some of the required fields for creation of the electronic wallet. The enrollee may then be prompted to register one or more financial accounts, such as a credit, debit, or checking account by providing the appropriate account information, such as a credit or debit card number, expiration date, and security code or, in the case of a checking account, a routing number and account number. If the enrollee registers more than one financial account, certain embodiments may permit the enrollee to designate one of such financial accounts as a default account which will be used for the online payment transactions unless overridden during a transaction. All such user information is then stored as an electronic wallet at electronic wallet database 124 and associated with an internal user identifier (e.g., a user identification number) used to track the user's various information among the various databases of the APS 100 (step 222).

As previously mentioned, some users may already have an electronic wallet and/or biometric templates stored with APS 100 as a consequence of a prior enrollment in affiliated systems. For these previously enrolled users, the collection of biometric templates from steps 210-214 would be unnecessary; the system would associate the BSD device identification information with their previously collected biometric templates and proceed from step 216 and generate a federated identity to be used between the APS 100 and the particular OSP.

Online Authentication of Registered User

Figure 3:
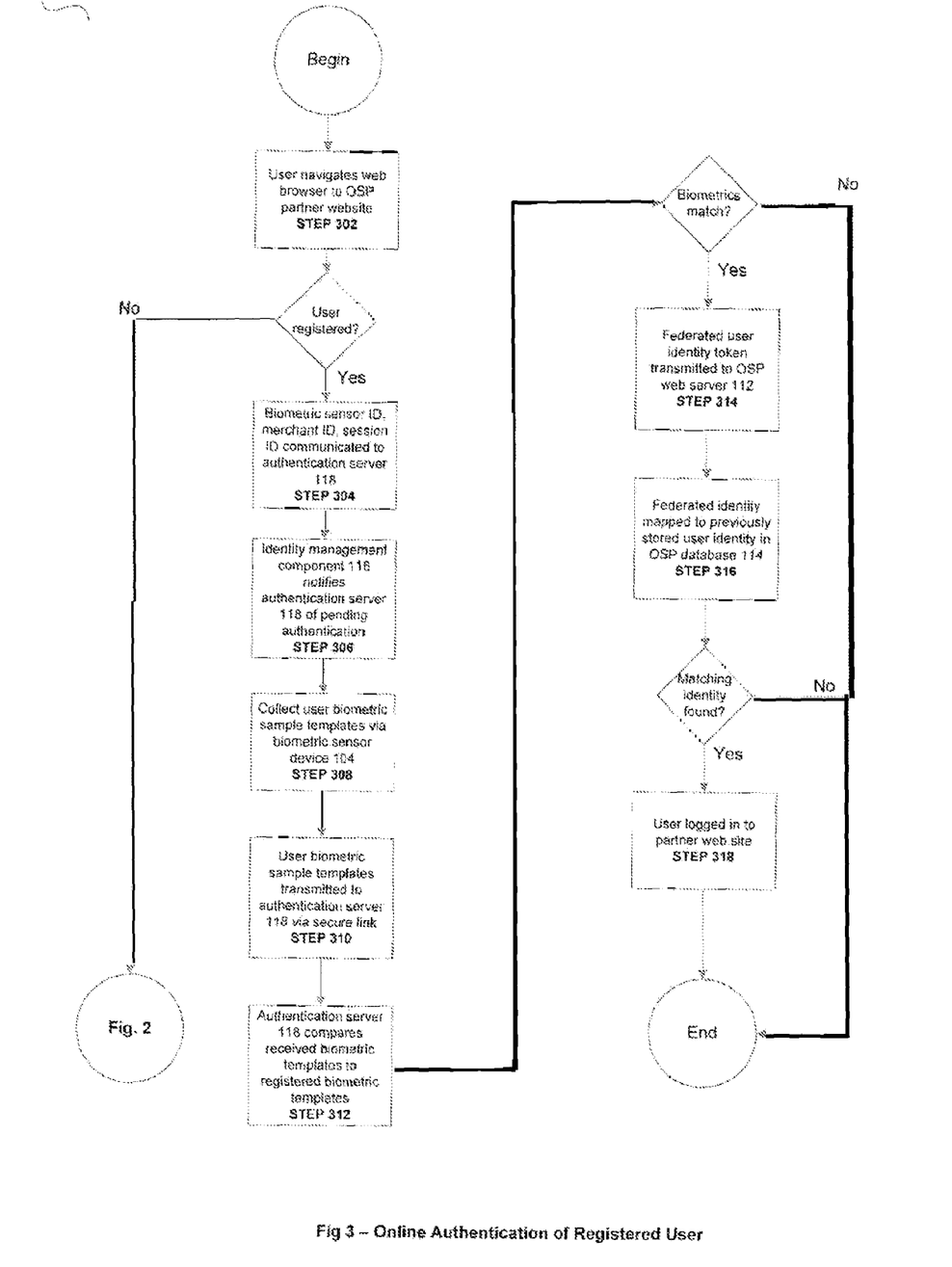
FIG. 3 depicts a flow chart for an exemplary process of authenticating an enrolled user for online access to a partnered online service provider website via an authentication provider service according to an embodiment.

FIG. 3 depicts a process flow for biometrically logging in a user who has registered with the APS 100 and a particular OSP. When an APS 100 registered user navigates to a biometric authentication enabled website hosted by OSP web server 112 (step 302), the website detects that the user is registered for biometric authentication (for example, via communication between the web code embedded by identity management component 116 into the OSP website and the web browser component 110 or by detecting a cookie stored on user online terminal 102). The website may trigger the web browser component 110 to activate the BSD 104 and form a secure direct connection with APS 100 whereby the BSD 104 device identification information is set to the identity management component 116 in the APS 100 along with an OSP 112 identifier (such as the IP address of the OSP's server) and a session ID relating to the browser and/or user (step 304). The identity management component 116 may then notify the authentication server 118 that an authentication is pending on a particular user/browser session ID (step 306).

The BSD 104 is instructed by the web browser component 110 (e.g., via communication with device drivers 108) to collect a biometric sample, such as a finger image, from the user (step 308). Instructions for the user to submit their biometric sample could appear in a dialog box or an inline frame hosted by identity management component 116 of the APS 100 that is embedded within the OSP webpage. BSD 104 returns a biometric sample template to the web browser component 110, which may relay the template to the authentication server 118 via identity management component 116 over the established secure link (step 310). The authentication server 118 utilizes the previously received BSD 104 device identification information to locate registered user biometric templates stored in the biometric directory 120 in association with the BSD 104 device identification information (e.g. unique device number) and compares the registered user biometric templates with the collected biometric sample templates (i.e. more than one user might be registered to utilize a particular device for authentication) (step 312). If the comparison results in a match, the internal user identifier (e.g., user identification number) associated with the matched biometric template is used in combination with the OSP 112 identifier to locate in federated identity directory 122 a federated identity for that user particular to the OSP website being accessed, and the federated identity is transmitted to OSP web server 112 via web browser component 110 (step 314). The federated identity could be communicated or encoded, for example, as a SAML token that is compatible with security systems having federated identity "single sign-on" capabilities. The OSP web server 112 maps the federated identity to a previously stored user identity in OSP database 114 (step 316). If a matching stored user identity is found, the OSP web server 112 establishes a secure connection (e.g., SSL connection) with the user'web browser 106 on online terminal 102 and the user is logged in (step 318). The OSP web server 112 may send a completion response to identity management component 116. The authenticated user may now proceed to utilize logged in functionality on the OSP website.

Payment Processing with Online Authentication

Figure 4:
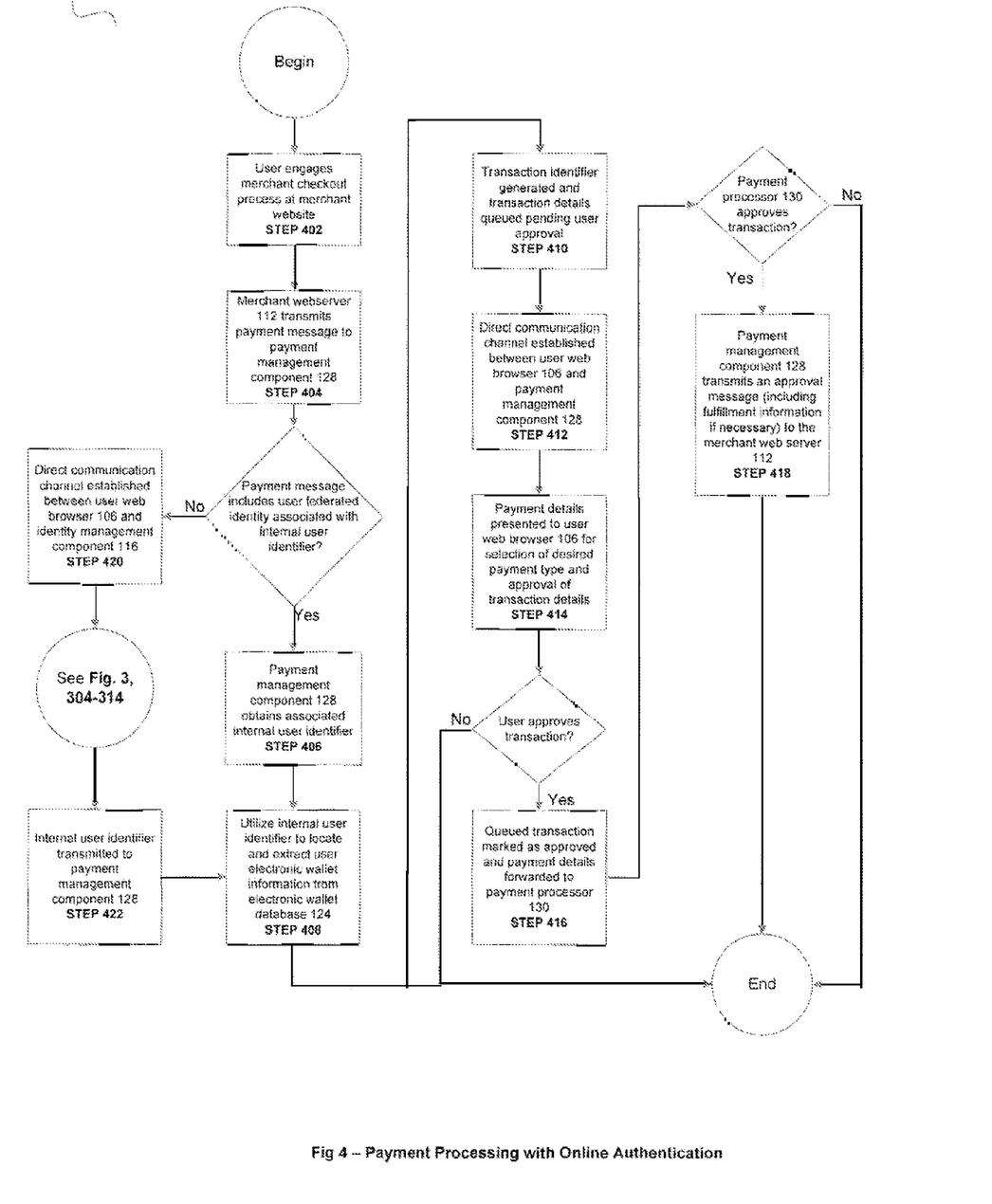
FIG. 4 depicts a flow chart for an exemplary process of performing an online payment transaction at an online service provider website via an authentication provider service according to an embodiment.

As depicted in FIG. 4, a user who has navigated to a merchant website may desire to conduct an e-commerce purchase transaction utilizing his electronic wallet information stored in electronic wallet database 124 of the APS 100. As used herein, a "merchant" is meant to refer to any OSP where secure payment transactions for e-commerce purposes would be desirable, including online retail merchants, government entities, university accounts payable offices, etc. As further detailed below, unlike the authentication process as described earlier, an e-commerce purchase transaction may not lead to the transmission of a federated identity to merchant with server 112, if the APS 100 itself is configured to process payment and interact with payment processor 130. During an e-commerce payment transaction, the user may peruse the merchant's e-commerce website, adding good to his electronic shopping cart (as managed by merchant web server 112) until he is ready to checkout. When the user engages the merchant's checkout process (e.g., by clicking a checkout button) (step 402), the merchant web server 112 may transmit a payment message to the payment management component 128 of the APS 100 (step 404). Such a payment message may include the amount of the purchase transaction, a description of the transaction, and merchant identification information (e.g., merchant account number and other identifying information) and/or any other merchant or payment transaction details or information which may be required by a payment processor 130 to authorize a payment transaction. If the user had, for example, previously, authenticated himself (e.g., prior to filling his shopping cart) to the merchant and had logged into his merchant account via the authentication process with the identity management component 116 as described in the previous section, the payment message transmitted from the merchant web server 112 to the payment management component 128 may also contain the federated identity of the user. In such a scenario, payment management component 128 would query the federated identity directory 122 and obtain the associated user identification information used internally (e.g., a user identifier) within the APS 100 among the various databases (step 406). The payment management component 128 would then submit the obtained internal user identification information to electronic wallet server 126, which would extract the user's electronic wallet from electronic wallet database 124 and provide it to the payment management component 128 (step 408).

Upon receipt of payment message from the merchant web server 112, the payment management component 128 generates a transaction identifier (e.g., transaction number) and places the transaction details in a queque awaiting ultimate approval from the user (step 410). The payment management component 128 sends a redirection request containing the transaction identifier back to the merchant web server 112 which subsequently interacts with the user'web browser 106 (and web browser component 110) thereby causing the web browser 106 412). By presenting to establish a direct channel of communication with payment management component 128 (step the transaction identifier to the payment management component 128 upon establishing this direct channel, the web browser 106 identifies itself and the payment management component 128 is able to present the payment details (e.g., user'credit card or debit card or eCheck information, etc.) to the web browser 106 and request selection of a desired payment type (e.g., where multiple payment types are available and/or the user has not already predefined a default payment type) and a confirmation from the user of the transaction details (e.g., amount, description of purchase, etc.) (step 414). Once the payment management component 128 receives approval from the web browser 106, it is able to mark the transaction in the queue as approved and forward the payment details (e.g., user'credit card or debit card or eCheck information, merchant's account, etc.) to payment processor 130 to accept the transaction (step 416). When the payment processor 130 confirms authorization of the transaction, the payment management component 128 transmits an approval message to the merchant web server 112, including the transaction identifier and the user's federated identity, thereby indicating to the merchant web server 112 that the transaction has been approved. The merchant web server 112 is able to access its own stored account information for the user to obtain the address of the user and any other personal information necessary to deliver the purchased goods to the user (or otherwise fulfill the transaction) (step 418). Alternatively, the payment management component 128 may not send the federated identity in the approval message transmitted to merchant web server 112, but instead may provide any additional information (e.g., user address, shipping address, etc.) necessary to fulfill the purchase.

In an alternative scenario, (e.g., the user shops anonymously) the user may not have logged into or possess a merchant account and therefore has not been authenticated by the identify management component 116 prior to engaging the checkout process. In such a scenario, the absence of a federated identity in the payment message from the merchant web server 112 to the payment management component 128 causes the payment management component 128 to redirect the direct connection that it establishes with the web browser 106 in step 412 to the identity management component 116 (step 420). The authentication process then follows steps 304-314 set forth in the previous section and in FIG. 3 except that in step 314, the obtained internal user identifier associated with the matched biometric template is transmitted to the payment management component 128 (rather than the federated identity directory) via the identity management component 116 (step 422). Thereafter, the process continues at step 408 until the payment transaction has been accepted.

In yet another alternative scenario, the user may have never previously visited the merchant's website but is a registered user of APS 100. In such a scenario, in addition to handing off user authentication responsibilities to the identity management component 116 through steps 420 and 422, the payment management component 128 may interact with federated identity directory 122 to generate a new federated identity for the user that is particular to this merchant and transmit relevant user information, which may include a user's name, email address, phone number, shipping address or other user information (as extracted from the electronic wallet database 124) needed by the merchant to establish a merchant account for the federated identity. In one embodiment, such federated identity and user information may be submitted to the merchant web server 112 in the payment transaction approval message in step 418. Alternatively, an anonymous merchant account for the user (e.g., without the user's name, email address, phone number, etc.) may be established by the merchant in association with the newly generated federated identity.

Those with ordinary skill in the art will recognize that alternative process flows may be utilized by the APS 100 to enable a user to conduct a payment transaction with merchant web server 112. For example, the payment management component 128 may transmit all payment particulars (obtained through the user's electronic wallet) to the merchant web server 112, which then could interact with payment processor 130 to finalize the payment transaction. In yet another alternative process flow, the authenticated user's electronic wallet information could be transmitted by the payment management component 128 to web browser 106 in order to populate required fields (e.g., in an OSP web page residing on user web browser 106) for payment authorization, such as full user name, account number, expiration data, billing address, etc. The information could then be communicated to OSP web server 112, and the OSP could then process the financial transaction utilizing existing methods for processing web-based transactions.

Additional Functions

In an additional embodiment, the APS 100 may enable "single sign on" functionality through the federated identity process. For example and without limitation, a user who has been authenticated at a first OSP may be automatically authenticated at a second OSP without an additional OSP username-password or biometric authentication request, so long as the user has established a federated identity with the second OSP in a prior registration process. Specifically, upon being informed by the second OSP that the user is requesting access, the APS 100 recognizes that the user has already authenticated the first OSP and forwards a federated identity associated with the user and the second OSP to inform the second OSP that the user is authenticated.

Similarly, the APS 100 could provide age verification for users conducting online transactions by utilizing personal demographic information contained in the user's electronic wallet. In order to utilize age verification functionality, users could be required to complete registration of their electronic wallets at an attended physical locations, such as a service desk or kiosk, where personal identity documents could be examined by a representative of APS 100. The APS 100 could additionally offer heightened levels of confidence as to the identity and demographic information. For example, a user registration where attested information is witnessed by a notary could be assigned the highest confidence level, whereas a user only having performed an online registration could be assigned a lesser confidence level.

Users of APS 100 would additionally be enabled to perform other functions, such as administrative functions. For example, a user could manage information contained in his electronic wallet via an online interface, possibly requiring the user be biometrically authenticated and/or identified via an additional pass code or other information. Users could additionally add or delete biometric sensor devices, or allow additional users to register for authentication with a particular BSD 104.

Although the present invention has been described with reference to one embodiment, those of ordinary skill in the art will recognize the changes may be made in form and detail without departing from the spirit and scope of this disclosure. Terminology used in the foregoing description is for the purpose of describing the particular versions or embodiments only, and is not intended to limit the scope of the present invention which will be limited only by the appended claims. As used herein and in the appended claims the singular forms "a," "an," and "the" include plural references unless the context clearly dictates otherwise. Similarly, the words "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to be construed as an admission that the embodiments disclosed herein are not entitled to antedate such disclosure by virtue of prior invention. Thus, various modifications, additions and substitutions and the like can be made without departing from the spirit of the invention and these are therefore considered to be within the scope of the invention as defined in the following claims.

What is claimed is:

1. A method for providing user authentication services to an online service provider, the method comprising:

receiving biometric device identification information associated with a biometric device coupled to an online terminal;

receiving a biometric sample of a user taken by the biometric device;

retrieving at least one registered biometric sample using the biometric device identification information;

comparing the biometric sample with the at least one registered biometric sample;

determining a match with the at least one registered biometric sample;

retrieving a user identifier associated with the matched registered biometric sample;

extracting a federated identity using the user identifier and the online service provider's identifier; and transmitting the federated identity to the online service provider.

2. The method of claim 1 wherein the biometric device identification information and the biometric sample are received through a direct connection with the online terminal.

3. The method of claim 2 further comprising (a) receiving through the direct connection network identifying information relating to the online service provider, and (b) utilizing the network identifying information to transmit the federated identity to the online service provider.

4. The method of claim 2 further comprising (a) receiving through the direct connection a session ID relating to an online communication session between the user and the online service provider, and (b) transmitting the session ID to the online service provider in conjunction with the step of transmitting the federated identity to the online service provider.

5. The method of claim 1 further comprising:

receiving, from the online service provider, payment transaction details relating to an e-commerce purchase being conducted by the user at the online service provider;

extracting electronic wallet information relating to the user identifier;

transmitting at least a portion of the electronic wallet information and at least a portion of the payment transaction details to a payment processor; and transmitting an approval message to the online service provider indicating whether the payment processor has authorized the e-commerce purchase.

6. The method of claim 5 wherein the payment transaction details include a purchase price and merchant account information.

7. The method of claim 5 wherein the electronic wallet information includes a financial account associated with the user.

8. The method of claim 5 further comprising the steps of (a) generating a transaction identifier associated with the payment transaction details, and (b) transmitting the transaction identifier to the online service provider as part of the approval message.

9. The method of claim 5 further comprising the steps of (a) establishing a direct connection with the online terminal, and (b) presenting at least a portion of the payment transaction details to the user through the direct connection with the online terminal for an approval by the user.

10. The method of claim 9 further comprising the steps of (a) presenting to the user at least one financial account in the electronic wallet information through the direct connection with the online terminal, and (b) receiving a selection of the at least one financial account from the user through the direct connection.

11. The method of claim 1, wherein the step of transmitting the federated identity to the online service provider occurs via the online terminal.

12. The method of claim 1, wherein the received biometric sample corresponds to one of a fingerprint scan of the user, an iris scan of the user, a voice scan of the user, a retinal scan of the user, a facial scan of the user and a hand architecture of the user.

13. A system for providing user authentication services to an online service provider, the system comprising:

a processor;

a communications interface in communication with the processor; and a processor-readable storage medium in communication with the processor, wherein the processor-readable storage medium contains one or more programming instructions for causing the processor to perform the following:

receiving, via the communications interface, biometric device identification information associated with a biometric device coupled to an online terminal, receiving, via the communications interface, a biometric sample of a user taken by the biometric device, retrieving at least one registered biometric sample using the biometric device identification information, comparing the biometric sample with the at least one registered biometric sample, determining a match with the at least one registered biometric sample, retrieving a user identifier associated with the matched registered biometric sample, extracting a federated identity using the user identifier and the online service provider's identifier, and transmitting, via the communications interface, the federated identity to the online service provider.

14. The system of claim 13, wherein the processor-readable storage medium further contains one or more programming instructions for causing the processor to perform the following:

receiving, via the communications interface, the online service provider's identifier; and utilizing the online service provider's identifier to transmit the federated identity to the online service provider.

15. The system of claim 13, wherein the processor-readable storage medium further contains one or more programming instructions for causing the processor to perform the following:

receiving, via the communications interface, a session ID relating to an online communication session between the user and the online service provider; and transmitting, via the communications interface, the session ID to the online service provider in conjunction with the federated identity.

16. The system of claim 13, wherein the processor-readable storage medium further contains one or more programming instructions for causing the processor to perform the following:

receiving, via the communications interface, payment transaction details relating to an e-commerce purchase being conducted by the user at the online service provider;

extracting electronic wallet information relating to the user identifier;

transmitting, via the communications interface, at least a portion of the electronic wallet information and at least a portion of the payment transaction details to a payment processor; and transmitting, via the communications interface, an approval message to the online service provider indicating whether the payment processor has authorized the e-commerce purchase.

17. The system of claim 16, wherein the payment transaction details include a purchase price and merchant account information.

18. The system of claim 16 wherein the electronic wallet information includes a financial account associated with the user.

19. The system of claim 16, wherein the processor-readable storage medium further contains one or more programming instructions for causing the processor to perform the following:

generating a transaction identifier associated with the payment transaction details; and transmitting, via the communications interface, the transaction identifier to the online service provider as part of the approval message.

20. The system of claim 16, wherein the processor-readable storage medium further contains one or more programming instructions for causing the processor to perform the following:

transmitting, via the communications interface, at least a portion of the payment transaction details to the user.

21. The system of claim 20, wherein the processor-readable storage medium further contains one or more programming instructions for causing the processor to perform the following:

transmitting, via the communications interface, to the user at least one financial account in the electronic wallet information; and receiving, via the communications interface, a selection of the at least one financial account from the user.

22. The system of claim 13, wherein the received biometric sample corresponds to one of a fingerprint scan of the user, an iris scan of the user, a voice scan of the user, a retinal scan of the user, a facial scan of the user, and a hand architecture of the user.

* * * * *